(12) United States Patent
Cooper et al.

(10) Patent No.: US 6,199,902 B1
(45) Date of Patent: Mar. 13, 2001

(54) APPARATUS AND METHOD FOR DISCERNING AT LEAST ONE OCCUPANT CHARACTERISTIC VIA ABSORPTION OF AN ENERGY SIGNAL

(75) Inventors: Stephen R. W. Cooper, Fowlerville; Frederic Marcel Sejalon, Commerce Township, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/249,838

(22) Filed: Feb. 12, 1999

(51) Int. Cl.[7] ................................................. B60R 21/32
(52) U.S. Cl. ........................................... 280/735; 280/734
(58) Field of Search ..................................... 280/735, 734

(56) References Cited

U.S. PATENT DOCUMENTS

| | | |
|---|---|---|
| 4,453,164 | 6/1984 | Patton . |
| 5,118,134 | 6/1992 | Mattes et al. ........................ 280/735 |
| 5,232,243 | 8/1993 | Blackburn et al. .................. 280/735 |
| 5,330,226 | 7/1994 | Gentry et al. ........................ 280/735 |
| 5,525,843 * | 6/1996 | Howing ................................ 280/735 |
| 5,653,462 | 8/1997 | Breed et al. ......................... 280/735 |
| 5,661,490 | 8/1997 | McEwan . |
| 5,954,360 * | 9/1999 | Griggs, III et al. .................. 280/735 |
| 6,007,095 * | 12/1999 | Stanley ................................ 280/735 |
| 6,026,340 * | 2/2000 | Corrado et al. ...................... 280/735 |

* cited by examiner

Primary Examiner—Brian L. Johnson
Assistant Examiner—Matthew Luby
(74) Attorney, Agent, or Firm—Tarolli, Sundheim, Covell, Tummino & Szabo L.L.P.

(57) ABSTRACT

A sensor arrangement (40 and 50) and an associated method are provided for sensing at least one occupant characteristic of a vehicle occupant (14). At least one transmitter (e.g., 42A) transmits an energy signal (e.g., 44A) toward an occupant location within a vehicle (12). At least one detector (e.g., 60A) detects whether absorption of the energy signal (42A) by the occupant (14) occurs and provides a signal (e.g., 74A) indicative thereof. An occupant sense module (50) processes the signal (74A) to determine at least one occupant characteristic. Preferably, the sensor arrangement (40 and 50) is part of an occupant protection system (10).

40 Claims, 9 Drawing Sheets

Fig.7B SHADOW "A"

Fig.7C SHADOW "B"

Fig.7D SHADOW "C"

Fig.7A

Fig.8B
SHADOW "A"

Fig.8C
SHADOW "B"

Fig.8D
SHADOW "C"

APPARATUS AND METHOD FOR DISCERNING AT LEAST ONE OCCUPANT CHARACTERISTIC VIA ABSORPTION OF AN ENERGY SIGNAL

FIELD OF THE INVENTION

The present invention is directed to sensing at least one vehicle occupant characteristic and is particularly directed to an apparatus and a method for determining at least one occupant characteristic via absorption of an energy signal for the purpose of controlling a vehicle occupant protection system.

BACKGROUND OF THE INVENTION

Vehicle occupant protection systems having an actuatable protection element are well known in the art. One particular type of actuatable protection system includes an inflatable protection module. An inflatable protection device of the module is commonly referred to as an air bag, and is mounted to inflate within the occupant compartment of the vehicle. The protection module has a source of inflation fluid and an electrically actuatable igniter, referred to as a squib.

The occupant protection system further includes a collision/crash sensor for sensing the occurrence of a vehicle crash condition and for providing an electrical signal indicative of the crash condition. When the sensor indicates that the vehicle is in a crash condition requiring inflation of the air bag to help protect a vehicle occupant (""a deployment crash condition""), an electric signal is provided to the squib for the purpose of igniting the squib. The squib, when ignited, activates the source of inflation fluid (e.g., ignition of a combustible gas or heat generating composition and/or opening of a container of pressurized gas). The source of inflation fluid is operatively coupled to the air bag, and, when activated, inflates the air bag.

Several known occupant protection systems include an occupant position sensor and a controller, which controls the associated protection module in response to a sensed position of a vehicle occupant. The occupant position sensor for such a system is an ultrasonic sensor, an infrared sensor, or a seating sensor. In response to the sensed occupant position, the timing of air bag deployment, the pressure of the inflated air bag, aiming of the air bag, and/or disabling the air bag are controlled. These controllable/adjustable aspects, collectively, adjust the dynamic profile of the air bag. A protection system with controllable/adjustable aspects is commonly referred to as a ""smart"" system.

One example of a system with an adjustable dynamic profile is disclosed in U.S. Pat. No. 5,232,243 to Blackburn et al., and assigned to TRW Vehicle Safety Systems Inc. This patent discloses that it is not always desirable to inflate an air bag with 100% of the inflation fluid (e.g., gas) provided from an inflation fluid source. The system disclosed by Blackburn et al. controls the amount of gas that inflates the air bag in response to the detected weight of the occupant. Another system disclosed in U.S. Pat. No. 5,330,226 to Gentry et al., and assigned to TRW Vehicle Safety Systems Inc., controls the amount of gas that inflates an air bag in response to detected occupant position.

SUMMARY OF THE INVENTION

The present invention provides a sensor system for sensing at least one occupant characteristic of a vehicle occupant. Means transmits an energy signal toward an occupant location within a vehicle. Means detects whether absorption of the energy signal by a vehicle occupant occurs and provides an absorption signal indicative thereof. Means processes the absorption signal to determine at least one occupant characteristic.

In accordance with another aspect of the present invention, a method is provided for sensing at least one occupant characteristic of a vehicle occupant. An energy signal is transmitted toward an occupant location within a vehicle. Occurrence of absorption of the energy signal by a vehicle occupant is detected. A signal indicative of the occurrence of energy absorption is provided. The absorption indicative signal is processed to determine at least one occupant characteristic.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which.

DESCRIPTION OF PREFERRED EMBODIMENTS

Figure 1:
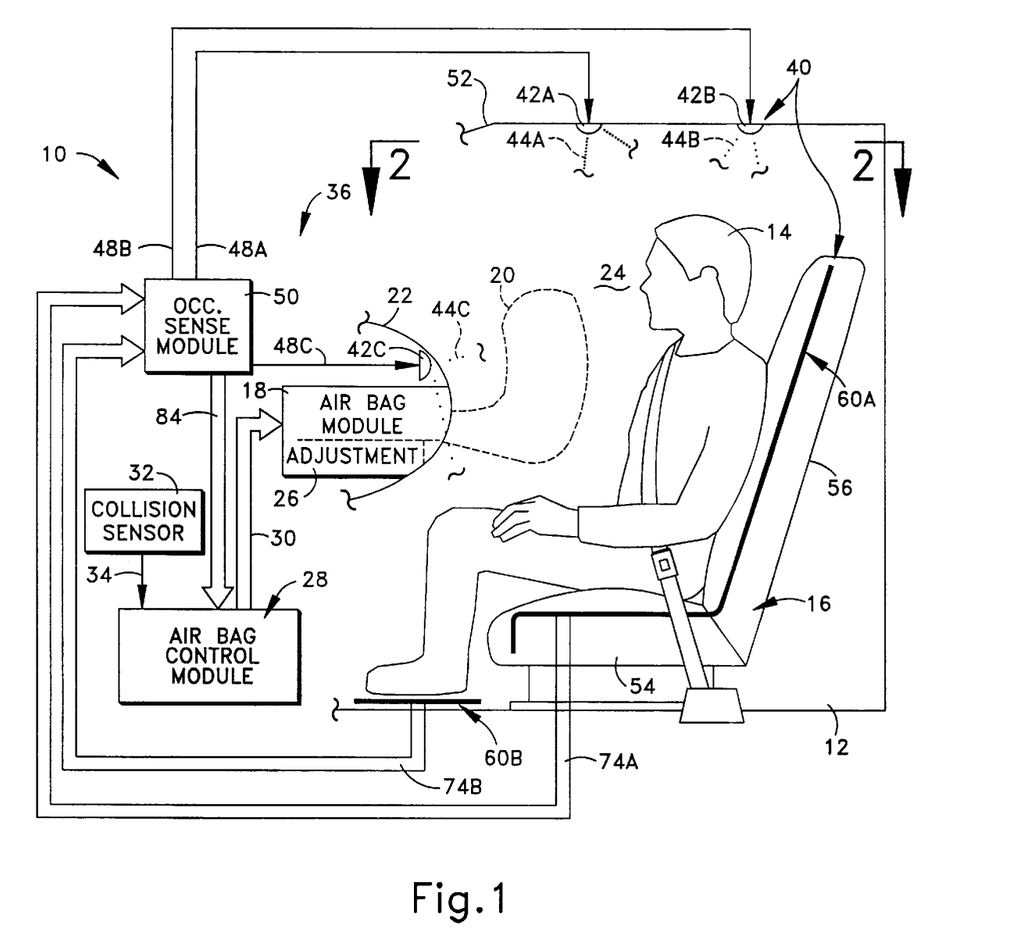
FIG. 1 is a schematic illustration of an occupant protection system that includes an occupant sensor system in accordance with the present invention, within a vehicle containing an occupant.

An occupant protection system 10 is schematically shown within a vehicle 12 in FIG. 1. The protection system 10 is"

provided for a vehicle occupant 14, who is a front-seat passenger and who is seated on a vehicle seat 16 within the vehicle 12. It is to be appreciated that the system 10 could be configured differently and provided for another person, e.g., a driver of the vehicle 12.

Within the system 10 is an actuatable occupant protection module 18, which includes an inflatable device 20. The inflatable device 20 is commonly referred to as an air bag, and thus the protection module 18 is commonly referred to as an air bag module. It is to be appreciated that the system 10 could include many other or different actuatable vehicle occupant protection devices, such as, for example, actuatable seat belts, actuatable knee bolsters, actuatable headliners or side curtains, and knee bolsters operated by inflatable air bags.

Prior to deployment, the air bag 20 is folded and stored within an instrument panel 22, as is known in the art. A source of inflation fluid, such as an inert gas, is operatively connected to the air bag 20. Inflation fluid from the source, which may be generated by combustion of pyrotechnic material and/or released from a pressurized container, fills the air bag 20 to an inflated condition (shown by the dash line representation) within an occupant compartment 24 of the vehicle 12. Once inflated, as occurs during a vehicle collision, the air bag 20 helps to protect the occupant 14.

The air bag module 18 is of the type referred to in the art as a "smart" module, in that the air bag module has at least one adjustable aspect 26. The adjustable aspect(s) 26 may be directed to deployment of the air bag 20. Examples of air bag deployment adjustment include adjustment of inflation timing, adjustment of inflation pressure, adjustment of location of the inflated air bag 20 relative to the occupant 14, and suppression of deployment of the air bag. A specific example of adjustment to inflation timing is control of the time of initiation of air bag inflation using a selected determination algorithm.

A specific example of adjustment of inflation pressure is control of the inflation fluid source to provide a controlled or pre-selected amount of inflation fluid to the air bag 20, e.g., the air bag module 18 has a plurality of separately controllable inflation fluid devices. Another specific example of adjustment of inflation pressure is control of a pressure relief valve, which vents inflation fluid away from the air bag 20. A specific example of adjustment of air bag positioning is control of positioning motors operative to pivot the air bag module 18 left or right within the instrument panel 22. Another specific example of adjustment of air bag positioning is moving the entire air bag module 18 toward or away from the occupant 14. Dynamic profile control is accomplished by controllably directing inflation fluid into the air bag 20 in predetermined zones within the air bag or by controlling the number and timing of operation of a plurality of inflation fluid devices and vent valves.

Control of the air bag module 18, to adjust the adjustable aspect(s) 26 and to cause actuation of the air bag module, is by an air bag control module 28. The control module 28 provides control signals 30 to the air bag module 18. In one example, the control module 28 is a microcomputer. The control module 28 receives sensory input from several sources and, using the sensory input, makes determinations regarding air bag module control.

One of the sensory input sources for the control module 28 is a sensor 32 that senses a vehicle condition for which the occupant 14 is to be protected. The sensor 32 provides a signal 34 to the control module 28 indicative of the sensed vehicle condition. In one example, which is illustrated in the Figures, the sensor 32 is a collision/crash sensor and senses a condition that is indicative of a vehicle collision. Preferably, the collision sensor 32 is an accelerometer, and the signal 34 is an electrical signal having a characteristic (e.g., voltage, frequency, etc.) indicative of the sensed crash acceleration. In another example, the sensor 32 senses a condition indicative of a vehicle rollover. It will be appreciated that the protection system 10 could have a plurality of sensors 32 providing signals 34 to the control module 28 which are indicative of a variety of vehicle conditions for which the occupant 14 is to be protected. Hereinafter, for the purpose of clarity, only the single collision sensor 32 and its collision indicative signal 34 are discussed.

The control module 28 analyzes the output signal 34 from the collision sensor 32 and determines if a deployment crash condition is occurring. A deployment crash condition is one in which deployment of the air bag 20 is desired to provide or enhance protection of the occupant 14. It is contemplated that any of several known crash algorithms can be used for the determination of a deployment crash condition. Examples of such algorithms are known in the art and are not discussed herein for brevity.

Sensory input to the control module 28 is also provided via an energy transmission/reception arrangement 40 as part of an occupant characteristic sensor system that functions to sense at least one occupant characteristic, in accordance with one aspect of the present invention. Specifically, the energy transmission/reception arrangement 40 provides for, and detects the presence/lack of an occupant by sensing at least one energy "shadow" that is indicative of at least one occupant characteristic. Information regarding the occupant characteristic(s) derived via the energy transmission/reception arrangement 40 is used by the control module 28 to determine control of the air bag module 18.

The energy transmission/reception arrangement 40 includes at least one transmitter 42 that emits an energy signal 44 that is directed at the occupant location. Specifically, the energy signal 44 is directed to at least a portion of the area within the vehicle 12 where it is anticipated that at least a portion of an occupant may occupy. It is to be appreciated that the occupant location is "fixed" in the vehicle 12 and "the occupant location" remains, even if the occupant 14 is absent.

In one preferred embodiment, three transmitters 42A–42C are provided, and the transmitters transmit very low power, divergent high frequency ("HF") electromagnetic ("EM") wave energy signals 44A–44C, respectively. The energy signals 44A–44C are abbreviated in FIG. 1, for clarity. The transmitters 42A–42C are controlled by respective signals 48A–48C from an occupant sense module 50. The occupant sense module 50 may be comprised of discrete circuitry, a microprocessor that performs a program, or a combination of discrete circuitry and the microprocessor.

Figure 2:
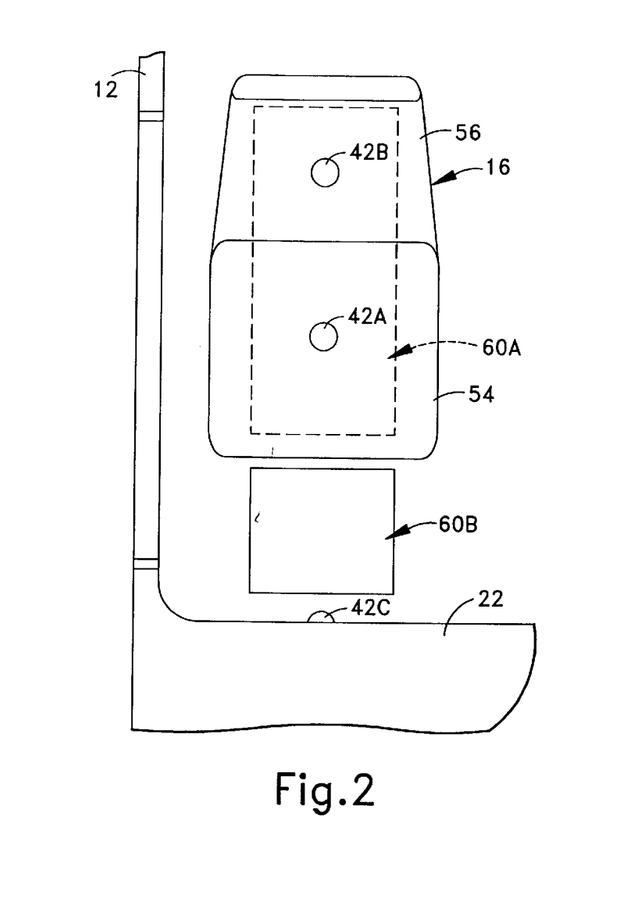
FIG. 2 is a view taken along line 2—2 in FIG. 1, with the occupant and certain structure removed.

The first transmitter 42A is mounted in a roof headliner 52 of the vehicle 12, at a location generally above a base 54 of the seat 16, and directs its energy signal 44A generally downward and rearward in a diverging pattern. As shown in FIG. 2, the first transmitter 42A is preferably centered above the seat 16, with regard to the left and right directions.

The second transmitter 42B (FIG. 1) is mounted in the roof headliner 52, at a location generally above a back 56 of the seat 16, and directs its energy signal 44B generally downward and forward in a diverging pattern. Similar to the first transmitter 42A, the second transmitter 42B (FIG. 2) is preferably centered above the seat 16, with regard to the left and right directions.

The third transmitter 42C (FIG. 1) is located in the instrument panel 22, generally forward of the seat 16 in the reference frame of the vehicle 12, and directs its energy signal 44C generally rearward and downward in a diverging pattern toward the seat. Preferably, the third transmitter 42C (FIG. 2) is aligned with the center of the seat 16, with regard to the left and right directions.

The three transmitters 42A–42C are illustrated as being exposed for clarity. It is to be appreciated that the transmitters 42A–42C could be "hidden" behind plastic or fabric (e.g., upholstery) portions of the vehicle 12. Hiding the transmitters 42A–42C is desirable for aesthetic or protection reasons, and is possible because plastic and fabric does not significantly attenuate the EM energy of the signals 44A–44C.

In one embodiment (FIG. 1), the three transmitters 42A–42C emit their respective energy signals 44A–44C at a single frequency (e.g., 22 GHz). It should be noted that, for the single frequency embodiment, only a single transmitter is operated at any given time (e.g., the operation of the transmitters 42A–42C is sequenced via the sequencing of the signals 48A–48C by the occupant sense module 50). Sequenced operation of the transmitters 42A–42C helps to avoid signal confusion when the transmitters use only a single frequency.

It is to be appreciated that any portion of the HF EM signals that impinges upon a body portion of the occupant 14 is at least partially absorbed by the body portion. This is due to the facts that the human body is composed primarily of water, and that HF EM energy is readily absorbed by water. The amount of HF EM signal absorption is related to the frequency of the signal, and size or bulk of the body portion that the signal impinges upon. For example, a torso of a human body tends to absorb a greater percentage of HF EM energy as compared to a hand of a human body.

It should also be noted that certain other materials that may be present within the occupant location, such as a newspaper, a book, or a child's balloon do not readily absorb the EM energy signals. Further, the clothing worn by the occupant, which can be bulky during cold weather use of the vehicle 12, does not readily absorb the energy signals. Also, smoke, dust, or air turbulence does not significantly affect propagation and absorption of the energy signals. With these aspects in mind, it is to be appreciated that, while HF EM energy is utilized in the embodiments disclosed herein, any energy signal that would be suitably absorbed by the human body could be used.

The energy transmission/reception arrangement 40 includes at least one detector 60 that can receive the energy signals 44A–44C, after the energy signals pass through the occupant location. Preferably, there are two detectors 60A and 60B. The detectors 60A and 60B are located on the "far" side of the occupant location from the transmitters 42A–42C, and the three transmitters are "aimed" such that each transmitter directs its signal to some portion of one or both of the detectors. If an occupant (e.g., 14) is present within the occupant location, the occupant causes at least one energy "shadow" to be cast upon at least a portion of one of the detectors 60A and 60B due to the fact that the occupant absorbs some of the energy that impinges upon the occupant from the sources 42.

Preferably, each detector (e.g., 60A) is a sheet-like member (FIG. 3) that extends across a sizable area. The first detector 60A has an extent that is approximately equal to the dimensions of the seat 16 (FIG. 1). Specifically, the first detector 60A is located within the seat 16, beneath the upholstery. The first detector 60A, extends across most of the width of the seat 16, and extends along most or all of the length of the seat base 54 and the seat back 56. Preferably, the first detector 60A is a single, continuous sheet, but the first detector could be separated into a plurality of sheet segments.

The second detector 60B is located under the carpet and floor mat (not shown for clarity) of the vehicle 12. The dimensions of the second detector 60B are such that the second detector extends across a substantial portion of the floor area allotted for the occupant 14.

Each detector (e.g., 60A) has a layered structure (FIG. 4) that can be manufactured using any known, suitable thick film or plating technique. A plurality of antenna elements or patches 62 is located in a first layer 64 of the detector. Each antenna element 62 is made of conductive material and is responsive to the HF EM energy.

The antenna elements 62 are arranged in an array in the first layer 64 and are separated from each other. For example, the array can be of N×M size, wherein there are N rows and M columns. In the illustrated embodiment (FIG. 3), adjacent rows and columns of the antenna elements 62 are offset.

Preferably, the antenna elements 62 have a square exposed face, with lateral dimensions that are related to the wavelength of the transmitted energy signals 44A–44C. In one embodiment, the lateral dimensions of the antenna elements are approximately one-half the wavelength of the transmitted signal. For a 12 GHz signal, the lateral dimension of each antenna element 62 is preferably one-half inch. A preferred spacing is to distribute the antenna elements one-inch apart on center.

Figures 3, 4:
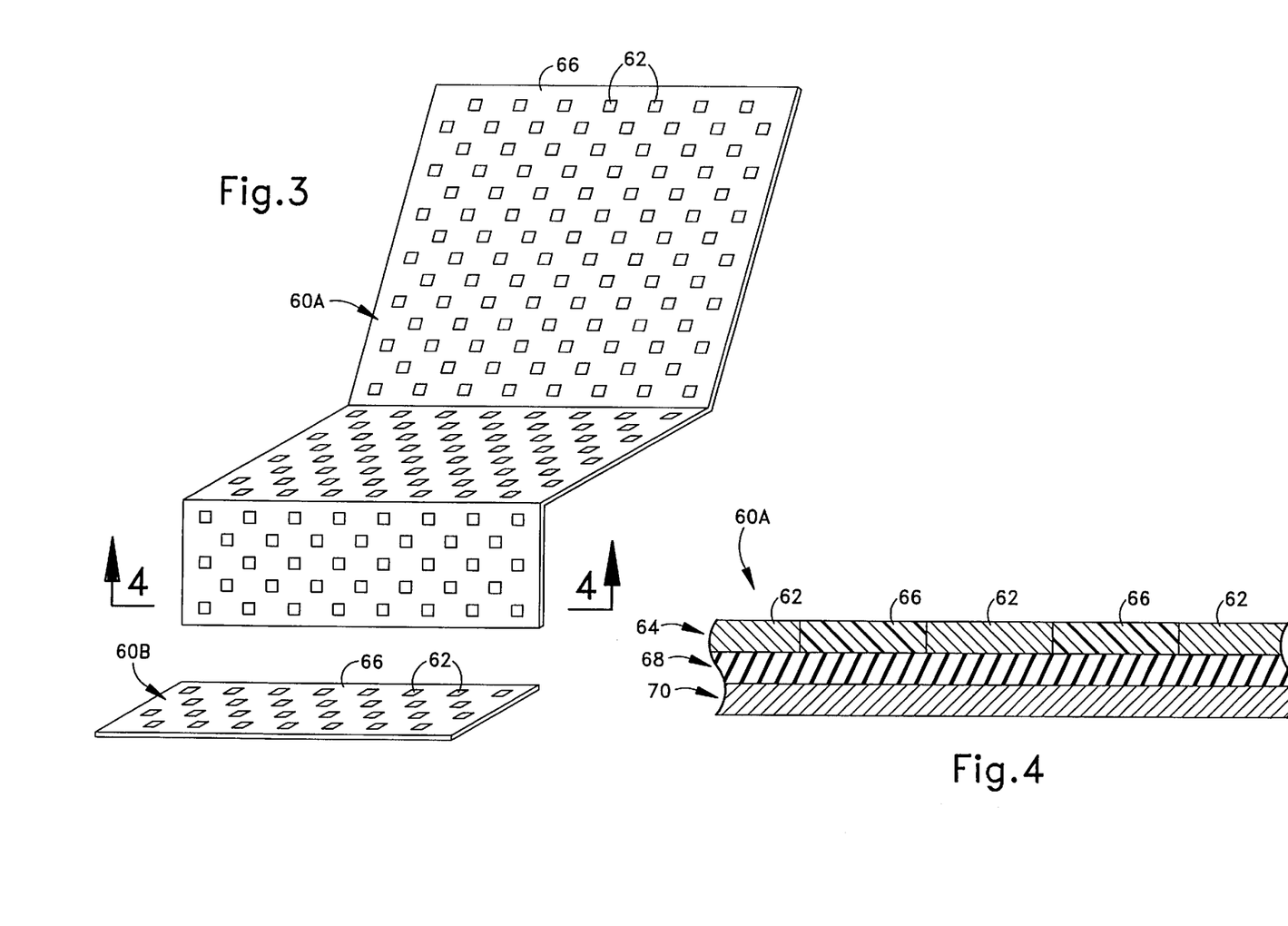
FIG. 3 is a perspective view of two detectors of the sensor system of FIG. 1.
FIG. 4 is a fragment of a section taken along line 4—4 in FIG. 3.

Within the first layer 64, the antenna elements 62 are separated from each other by air or are isolated from each other by an HF EM absorbing material 66 to minimize reflections and associated multi-path effects. In the illustrated example, material 66 is used (if air space is used, the location of the material 66 would be air space). The HF EM absorbing material 66 may either be solid between the antenna elements 62 (as is shown in FIG. 4), or an HF EM absorbing coating on top of another material separating the antenna elements. Several HF EM absorbing materials are known in the art, and are not discussed herein for brevity. It is to be noted that in most cases the antenna elements 62 are only a few mills thick, and the material (or air space) 66 is also only a few mills thick.

A second layer 68 of the detector structure is a dielectric material or a dielectric coated material. It is to be noted that antenna dimensions are dependent upon dielectric constant of the second layer 68. In one embodiment, the commercially available material KAPTON (DuPont™) is used in the second layer 68. A third, optional layer 70 of the detector structure is a ground plate that is made of a conductive material. Examples of construction of the third layer 70 include the use of conductive ink or copper.

The detectors 60A and 60B (FIG. 1) are operatively connected to the occupant sense module 50 to provide signals 74A and 74B to the occupant sensor control function. The signals 74A and 74B have electrical characteristics (e.g., voltage and/or frequency) that are indicative of the amount of EM energy that impinges upon the antenna elements 62. In other words, if a portion of the occupant 14 is located between a transmitter (e.g., 42A) and an antenna element 62 of a detector (e.g., 60A) the occupant absorbs the energy signal (e.g., 44A), either completely or partially, before the energy signal reaches the antenna element. Thus, the associated signal (e.g., one of the signals 74A) indicates that no, or little, HF EM energy reached the antenna element 62.

In the preferred embodiment, the signals (e.g., 74A) are conveyed via electrical traces that run on a front side of the material 66 (FIG. 4), between the antenna elements in the first layer 64, or on a backside of the detector (e.g., 60A). In other words, the electrical traces do not run across the faces of the antenna elements. The electrical traces extend out of the detector (e.g., 60A) to the occupant sense module 50.

Figure 5:
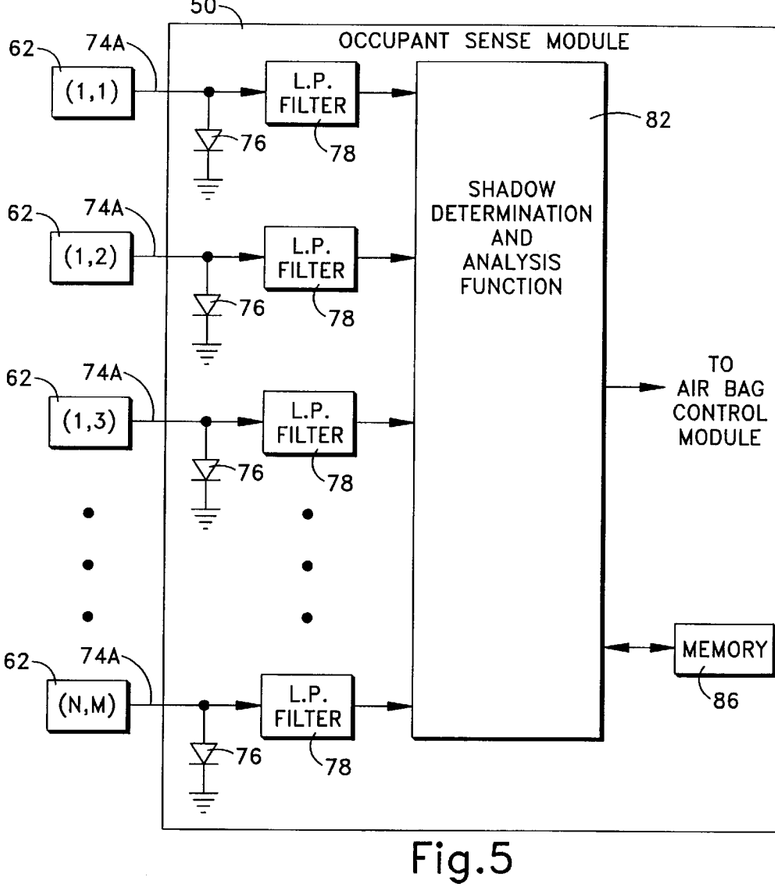
FIG. 5 is a schematic circuit diagram of a portion of an occupant sense module of the sensor system shown in FIG. 1.

At the occupant sense module 50 (FIG. 1), the signals 74A, 74B are suitably preprocessed so as to return signal characteristics. FIG. 5 illustrates one example of circuitry provided for such preprocessing. The illustrated example structure is for the signals 74A from the matrix of antenna elements 62 of the first detector 60A. It is to be appreciated that similar structure is provided for the signals 74B from the second detector 60B.

In FIG. 5, each line conveying a signal 74A is shown as extending from one of the antenna elements 62. For aid in understanding that each antenna element 62 is part of a predefined array, the antenna elements 62 are identified by row and column indicia (e.g., N×M) in FIG. 5. In order to preprocess the signal, a diode 76 is connected between each line and electrical ground to rectify the signal 74A. Also, an associated low pass filter 78 is connected to each line conveying one of the signals 74A. Additionally, preamplifiers could be placed before the rectifier to allow operation at lower transmission strengths (e.g., less than 600 mW) for health reasons. Further, multiplexing circuits could be used to lower the number of rectifiers and possibly preamplifiers and/or to reduce the number of inputs required in any associated microprocessor.

Once the signals 74A and 74B are preprocessed, the signals are provided to a shadow determination and analysis function 82 of the occupant sense module 50. Within the shadow determination and analysis function 82, it is determined, which of the antenna elements 62 within the matrices of the first and second detectors 60A and 60B are in a "shadow" of the occupant 14 for each of the three energy signals (e.g., 44A). Specifically, the amount of HF EM energy received at each of the antenna elements 62 is determined.

Based upon the determination of which of the antenna elements 62 received the EM energy, and which of the antenna elements received none or little, a representation of a "shadow" is created. This process is referred to herein as "shadow determination" for simplicity. The shadow determination process is repeated for each of the three transmitters 42A–42C.

Once the "shadows" are determined for the three transmitters 42A–42C, the shadows are analyzed to make at least one determination regarding an occupant characteristic. Occupant characteristics include, but are not limited to, presence/absence of an occupant, position of the occupant with respect to the interior components of the vehicle 12, size of the occupant (e.g., large or small person), and the type of the occupant (e.g., an adult occupant or a child occupant in a child seat including direction). Thus, the energy transmission/reception arrangement 40 (e.g., the transmitters 42A–42C, the detectors 60A and 60B), and the occupant sense module 50 form an occupant characteristic sensor system. Preferably, and as shown in the disclosed embodiment, the energy transmission/reception arrangement 40, and the entire occupant sensor system are part of the protection system 10.

In one embodiment, the determination(s) regarding occupant characteristics are made by comparing shadows size(s) and pattern(s) with information regarding shadow size and pattern stored within a memory 86. In other words, anticipated occupant types, sizes, positions, etc. have a corresponding shadow pattern stored in memory 86. By comparing the monitored shadow pattern with stored pattern information, the type, size, position, etc. of the occupant 14 can be discerned. This process is referred to herein as "recognizing the shadow pattern."

For example, if no shadows are detected, then a human occupant is not present. As another example, if a shadow of a human leg or foot does not occur, then it can be inferred that any occupant present may be an infant in an infant seat. Further processing could determine if the child in the infant seat is rearward or forward facing. Similar shadow comparisons and determinations are performed for other occupant size, type, and location issues. The results of these determinations are then assembled into an occupant characterization. A signal 84 that is indicative of the determination(s) is provided to the air bag control module 28.

It should be appreciated that increased resolution of finer details of shadows could be accomplished. Specifically, it is possible to distinguish body parts (e.g., discriminate between a head and a hand held aloft), if distinguishing body parts is desirous in a particular implementation of the present invention. The amount of resolution is dependent upon the density of the energy signals and/or the density of the antenna elements. Also, the transmitters may output energy signals that have characteristics (e.g., absorbency at various frequencies) that are more sensitive to the features of the occupant.

Figure 6A:
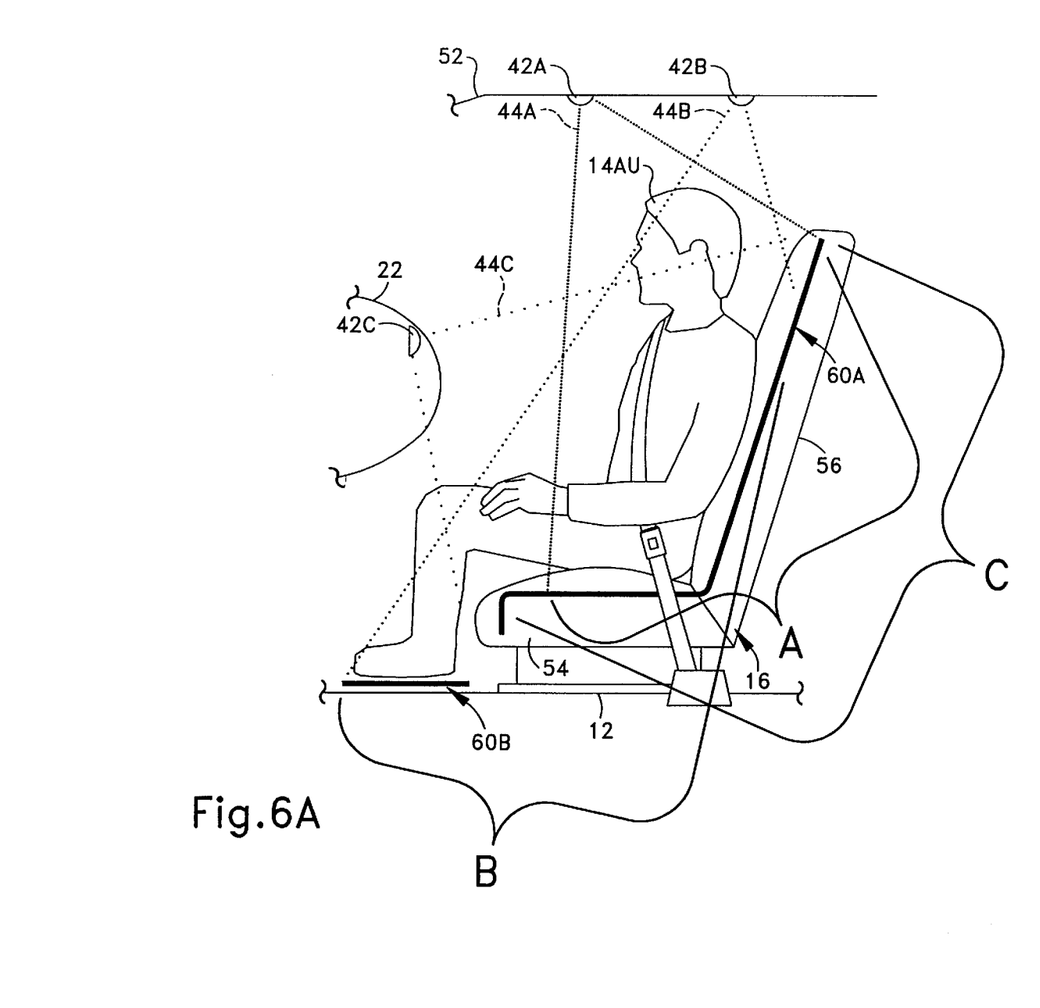
FIG. 6A is a view similar to FIG. 1, and shows the creation of shadow patterns from a first type of occupant in a first position.

Examples of shadow types, sizes, and locations are shown in FIGS. 6A–8D. In FIG. 6A, an adult occupant is located in a substantially upright, seated position. The occupant is designated 14AU (adult, upright). The energy signal 44A from the first transmitter 42A has a "shadow" along the portion of the first detector 60A, which is designated by the bracket "A" in FIG. 6A. Because the first energy signal 44A is not directed onto the second detector 60B, neither an "image" nor a shadow is formed on the second detector by the first energy signal 44A. The shadow "A" created on the detectors 60A and 60B by the first energy signal 44A is schematically represented in FIG. 6B.

Similarly, the energy signal 44B from the second transmitter 42B has a "shadow" along the first and second detectors 60A and 60B, which is designated by the bracket "B" in FIG. 6A. The shadow "B" created on the detectors 60A and 60B by the second energy signal 44B is schematically represented in FIG. 6C.

The energy signal 44C from the third transmitter 42C has a "shadow" along the first detector 60A, which is designated by the bracket "C" in FIG. 6A. The shadow "C" created on the detectors 60A and 60B by the third energy signal 44C is schematically represented in FIG. 6D. Similar to the first energy signal 44A, the third energy signal 44C is not directed on the second detector 60B. Thus, neither an image nor a shadow is formed on the second detector by the third energy signal 44C. The occupant sense module 50 would determine through image comparison that, based on the images 6B–6C, an adult occupant is located on seat 16 and is seated in an upright manner.

Figure 6B:
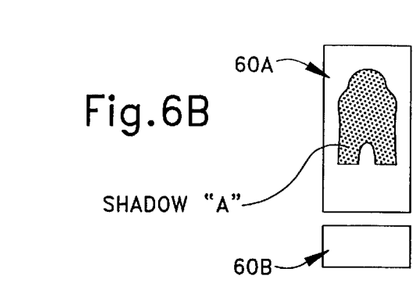
FIG. 6B is a plan view of the detector members shown in FIG. 4, and shows the shadow pattern from the occupant of FIG. 6A for a first energy signal.
Figure 6C:
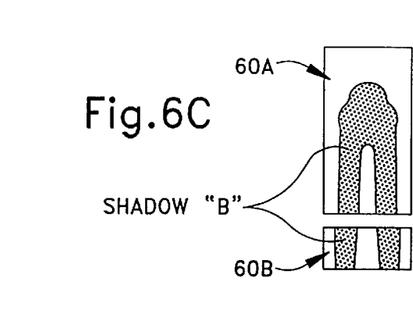
FIG. 6C is a view similar to FIG. 6B, and shows the shadow pattern for a second energy signal.
Figure 6D:
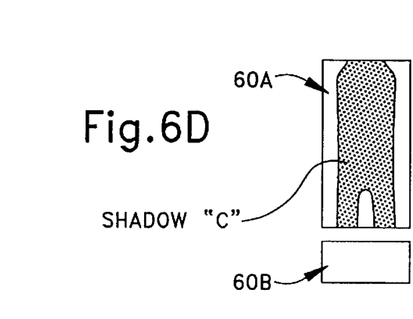
FIG. 6D is a view similar to FIG. 6B, and shows the shadow pattern for a third energy signal.

It should be noted that the shadow representations in FIGS. 6B–6D, and like Figures herein, are rudimentary, and do not show varying degrees of HF EM energy illumination due to non-impingement outside of an aiming field, partial absorption, etc. In particular, non-impingement is not shown in FIGS. 6B–6D, and like Figures herein. FIGS. 6B–6D and like Figures are provided herein to illustrate a concept of shadow comparison only.

Figure 7A:
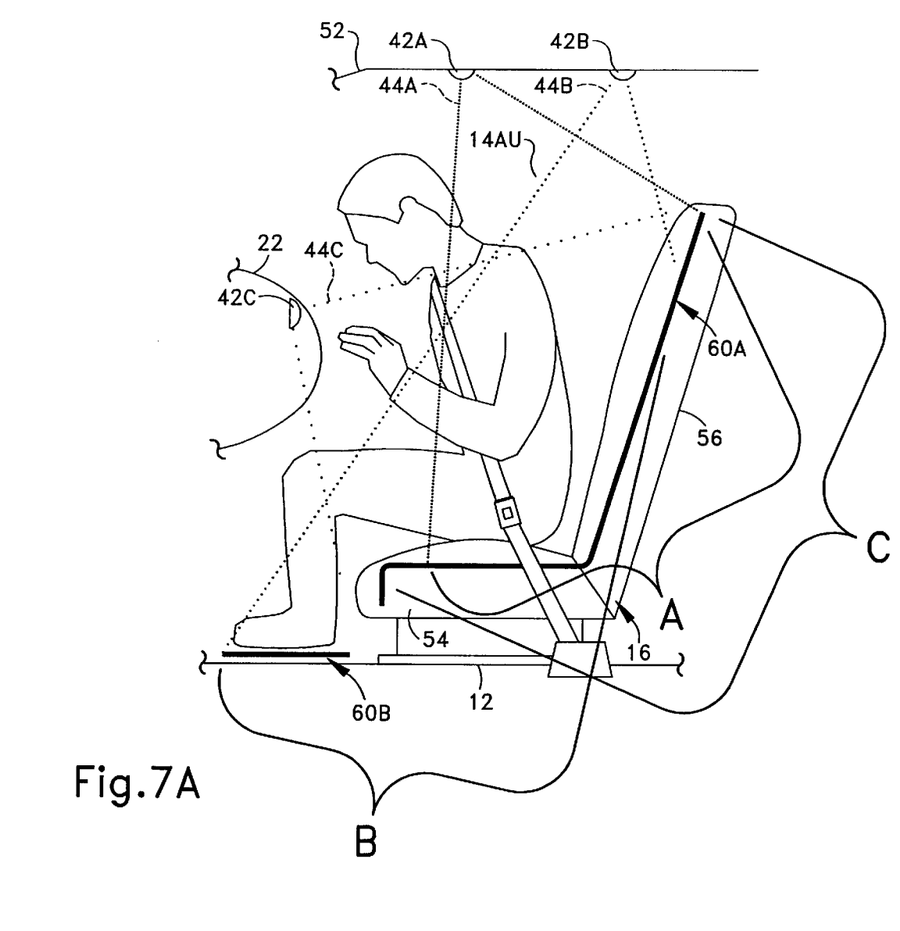
FIGS. 7A–7D are similar to FIGS. 6A–6D, respectively, but show shadow patterns from the first-type occupant in a position that differs from the position of the occupant for the scenario of FIGS. 6A–6D.

An adult occupant who is positioned such that the head and torso of the occupant are located relatively near the instrument panel 22 of the vehicle 12 is shown in FIG. 7A. The occupant is designated 14AF (adult, forward). In FIG. 7A, the occupant 14AF has moved forward to look for an object within a glove box (not shown) in the instrument panel 22.

Figure 7B:
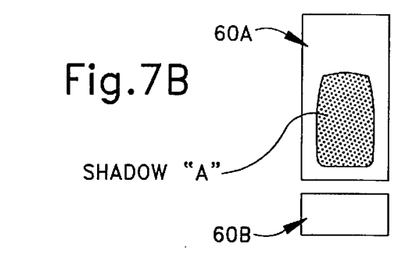
Figure 7C:
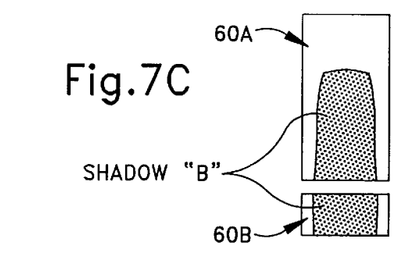
Figure 7D:
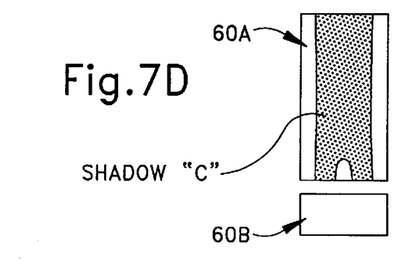

The "shadows" for the first-third energy signals 44A–44C are represented in FIG. 7A by brackets "A"–"C", respectively. The shadows are for the first-third energy signals 44A–44C are shown in FIGS. 7B–7D, respectively. The differences (e.g., position and size) between the shadows for the scenario of FIGS. 7A–7D compared to FIGS. 6A–6D are readily apparent. Similarly, the thickness of the occupant is related to the amount of energy absorption by the occupant. Greater energy absorption results in a "deeper" shadow. Comparison of shadow "depth" (i.e., degree of energy absorption) as well as shadow size and shape provides information concerning the size, shape, and mass of the occupant. Thus, upon such shadow occurrence, the occupant sense module 50 would determine, again, using shadow comparisons, that a forward leaning adult is present on seat 16.

Figure 8A:
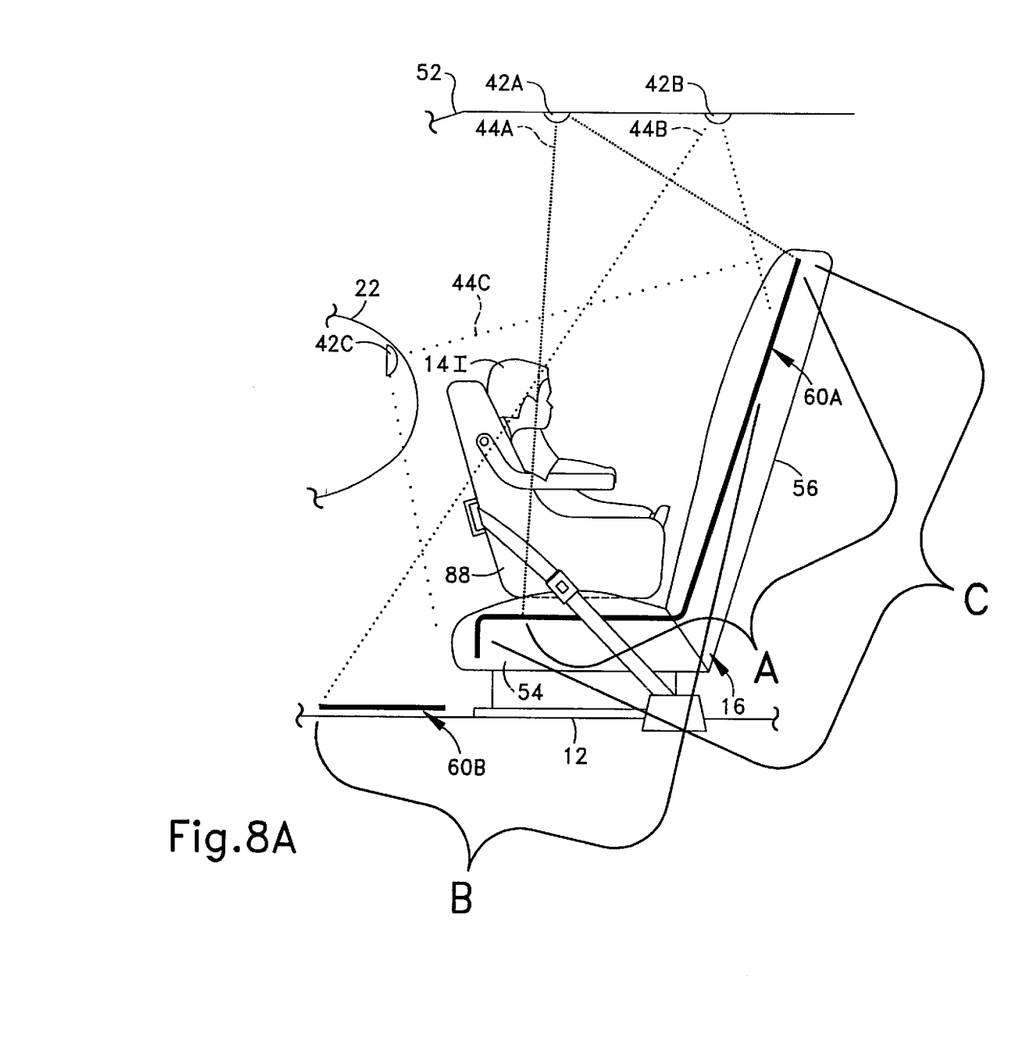
FIGS. 8A–8D are similar to FIGS. 6A–6D, respectively, but show shadow patterns from another type of occupant.
Figures 8B, 8C:
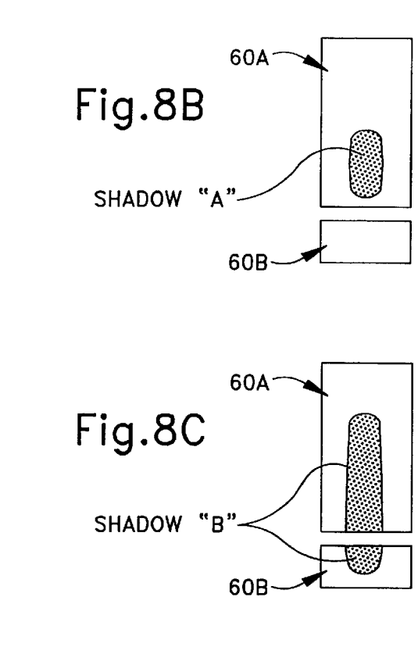
Figure 8D:
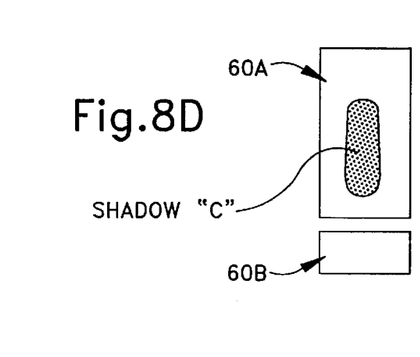

An infant occupant (designated 14I) who is located in a rearward facing infant seat ("RFIS") 88 which is located on the seat 16 is shown in FIG. 8A. The "shadows" for the first-third energy signals 44A–44C are represented in FIG. 8A by brackets "A"–"C", respectively. The shadows "A–C" for the first-third energy signals 44A–44C are shown in FIGS. 8B–8D, respectively. The differences (e.g., position and size) between the shadows for the scenario of FIGS. 8A–8C compared to FIGS. 6A–6D and FIGS. 7A–7D are readily apparent. Upon such shadow occurrence, the occupant sense module 50 would determine, again, using shadow comparisons, that a rearward-facing child in a restraint seat is present on the seat 16.

The determined occupant characteristic(s) are used to make determinations regarding control of the air bag module 18. If it is determined that a human occupant is not present, then deployment of the air bag module 18 is, preferably, inhibited. Inhibiting the deployment when an occupant is not present is for cost economy (e.g., deploying an air bag when an occupant is not present is economically wasteful). If it is determined that an infant occupant 14I in a rearward facing infant seat (FIG. 8A) is present, deployment of the air bag module 18 is, preferably, inhibited.

If it is determined that an adult occupant (e.g., 14AU or 14AF) is present, further determinations are made as to whether the occupant is located in a position in which deployment of the air bag module 18 will enhance protection of the occupant. If the occupant (e.g., 14AU or 14AF) is located in a position in which protection will not be enhanced, e.g., the position depicted by 14AF, deployment of the air bag module 18 is inhibited. Further, the deployment profile of the air bag module 18 can be modified, via changes to the adjustable aspect(s) 26 of the air bag module to enhance protection of the occupant (e.g., 14AU or 14AF) upon deployment of the air bag module. For example, if the shadow comparison indicates a small adult sitting slightly forward, the amount of fluid used to deploy the air bag could be reduced.

Figure 9:
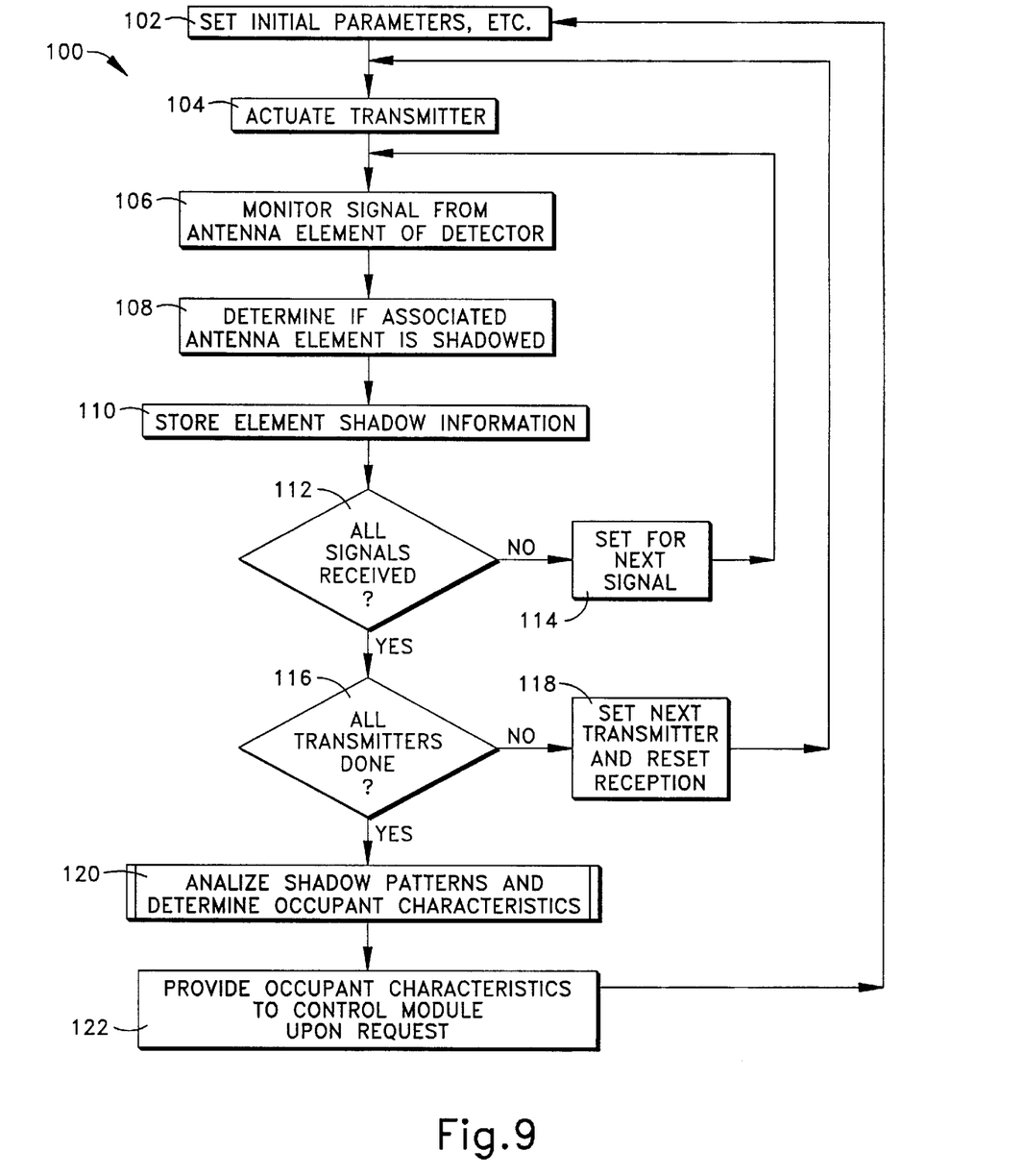
FIG. 9 is a flow chart for a process preformed in accordance with the present invention within the occupant sense module shown in FIG. 1.

A flow chart of a process 100 performed within the occupant sense module 50, in accordance with a preferred embodiment of the present invention, is shown in FIG. 9. The process 100 begins at step 102, wherein initial parameters are set and other initial procedures are performed. For example, within step 102, the first transmitter 42A and the first detector 60A are selected for operation during an initial portion of the occupant characteristic detection process. At step 104, the selected transmitter (e.g., 42A) is actuated. At step 106, a first signal (e.g., one of 74A) from an associated antenna element (e.g., one of 62) of the selected detector (e.g., 60A) is received. It should be noted that each of the signals (e.g., 74A) of the selected detector (e.g., 60A) would be monitored in turn. Any particular order may be utilized to monitor the signals (e.g., 74A). Because the antenna elements 62 are arranged in a matrix array, it is preferred that the signals (e.g., 74A) be monitored in a sequence that corresponds to the row in column format of the antenna elements.

At step 108, it is determined if the received signal (e.g., one of 74A) is indicative of the associated antenna element (e.g., one of 62) being located within an energy shadow as a result of energy absorption by a body part of the occupant 14. At step 110, the result of the determination as to whether the antenna element (e.g., one of 62) is located within a shadow is stored for later use.

At step 112, it is determined whether all of the signals (e.g., 74A) from the selected detector (e.g., 60A) have been received. If the determination at step 112 is negative, the process 100 goes to step 114, in which the parameters are set to receive the next signal (e.g., a next one of 74A). Upon completion of step 114, the process 100 returns to step 106, wherein the next signal is received.

When all of the signals (e.g., 74A) are received and the associated determinations regarding antenna element shadowing have been made, the determination at step 112 will be affirmative. For an affirmative determination at step 112, the process 100 goes to step 116. At step 116, it is queried whether each of the transmitters 42A–42C has transmitted their respective signals 44A–44C to cast shadows upon the detectors 60A and 60B. If all of the transmitters 42A–42C have not yet transmitted their respective signals 44A–44C, the determination at step 116 is negative and the process goes to step 118.

At step 118, the next transmitter (e.g., 42B) is set and the reception process is reset (e.g., loop counters are reset). Upon completion of step 118, the process 100 returns to step 104 wherein the next transmitter (e.g., 42B) is actuated. Proceeding from step 104, the process 100 goes through steps 106, etc., and the shadow caused by the occupant 14 for the signal (e.g., 44B) from the next transmitter (e.g., 42B) is determined. When all of the transmitters 42A–42C have been actuated and shadows from the transmitters have been detected and determined, the determination at step 116 will be affirmative.

Upon the affirmative determination at step 116, the process 100 goes to step 120. At step 120, the shadow patterns on the detectors 60A and 60B for the energy signals 44A–44C from the transmitters 42A–42C are compared and analyzed. Further, from the analysis, at least one occupant characteristic is determined. It should be appreciated that several sub-steps are performed within step 120. In addition to the use for determining the shape of a shadow pattern, the relative degree of shadowing (amount of absorption) can also be used to derive an estimation of relative occupant mass. For instance, a thicker heavier torso will absorb a greater percentage of incident energy than will a thinner torso.

Upon completion of step 120, the process 100 goes to step 122. At step 122, the determined occupant characteristics are provided to the control module 28, upon request from the control module. Upon completion of step 122, the process loops back to step 102 (i.e., the beginning of the process 100).

Within the control module 28, the provided occupant characteristics are used to control the air bag module 18. Specifically, it is queried whether an occupant is not present (e.g., absent), whether the occupant is an infant in a rearward facing infant seat ("RFIS"), or the occupant is within an occupant out-of-position ("OOP") zone. If the occupant is an infant in a RFIS or the occupant is in the OOP zone, the air bag module 18 is disabled. If an occupant is present, but the occupant is not an infant and is not within an OOP zone, appropriate adjustments for the determined characteristic are determined for the air bag module 18. For example, the timing, pressure, placement of the deploying air bag, etc. commensurate with the determined characteristic are determined such that the adjustments are employed during actuation of the air bag module 18.

Figure 10:
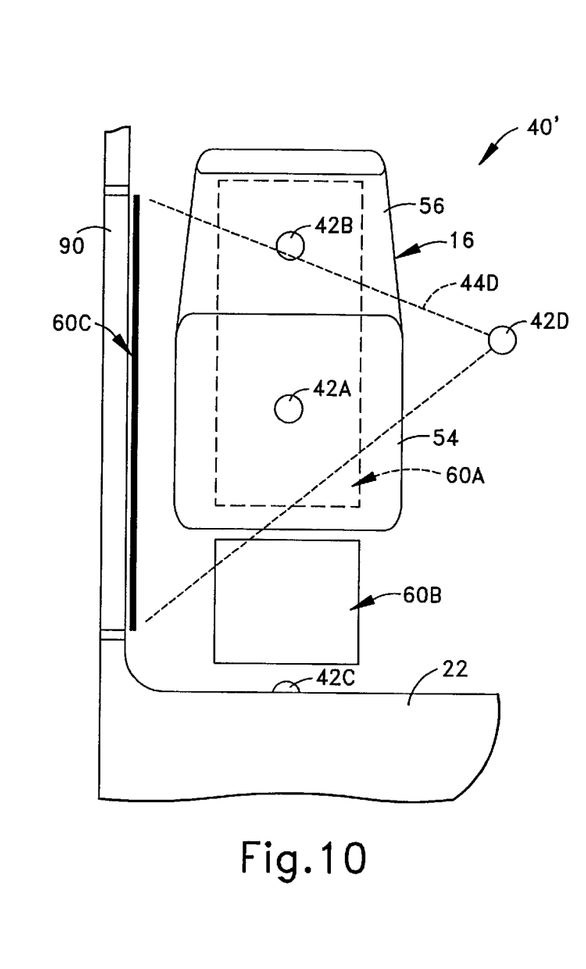
FIG. 10 is a view similar to FIG. 2, but for a second sensor system embodiment in accordance with the present invention.

A second embodiment of the energy transmission/reception arrangement 40', in accordance with the present invention, is shown in FIG. 10 (which is an overhead view similar to FIG. 2). The second embodiment (FIG. 10) is similar to the first embodiment, and structural elements that are identical to their counterpart of the first embodiment are identified by the same reference numeral. The second embodiment differs from the first embodiment by the addition of a fourth transmitter 42D, a third detector 60C, and a modified occupant sense module 50 (not shown in FIG. 10, for brevity).

Preferably, the fourth transmitter 42D has a construction that is similar to the construction of the first-third transmitters 42A–42C. The fourth transmitter 42D is mounted in the roof headliner 52 of the vehicle 12, at a location above the seat 16 and offset from the center of the seat toward the center of vehicle 12, with regard to the left to right directions (e.g., the transmitter 42D is located inboard of the seat). The fourth transmitter 42D directs its energy signal 44D downward and outward toward a passenger side door 90. The energy signal 44D is aimed to pass through the occupant location.

Figure 11:
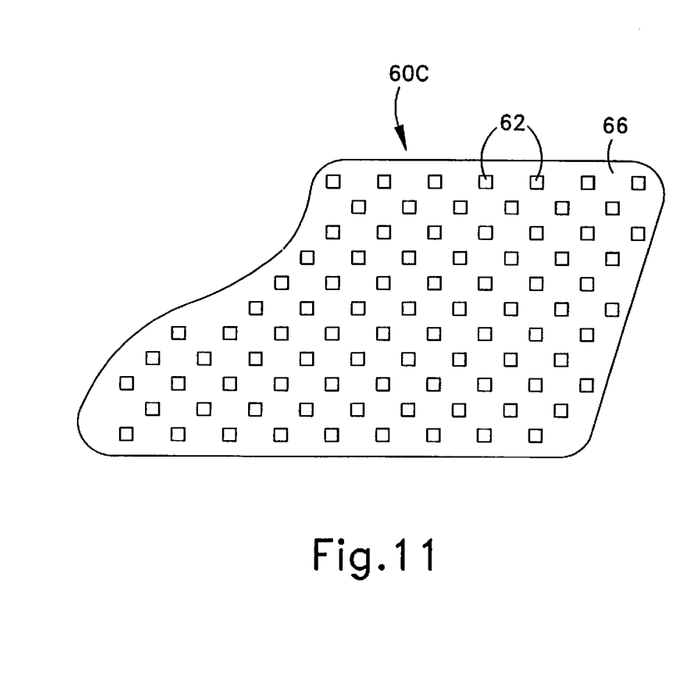
FIG. 11 is a view of a detector member of the sensor system of FIG. 10.
Figure 12A:
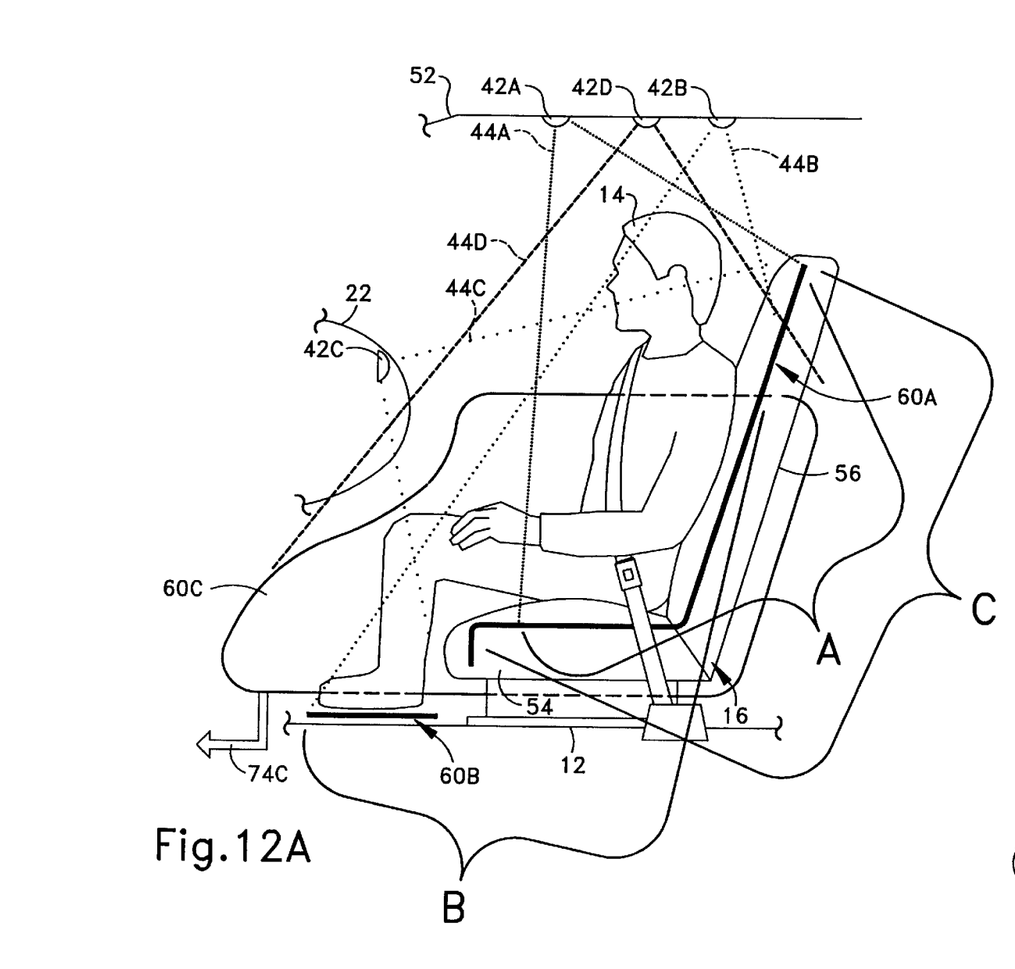
FIG. 12A is a view similar to FIG. 6A, but for the second embodiment shown in FIG. 10.

The third detector 60C is located within the passenger side door 90, and can receive the energy signal 44D from the fourth transmitter 42D, after the energy signal passes through the occupant location. Thus, the third detector 60C is located on the "far" side of the occupant location from the fourth transmitter 42D. Preferably, the third detector 60C is a sheet-like member (FIG. 11) that extends across a sizable area of the door 90. If an occupant 14 (FIG. 12A) is present within the occupant location, the occupant will cause a "shadow" to be cast upon at least a portion of the third detector 60C due to the fact that the occupant absorbs the EM energy.

Figure 12B:
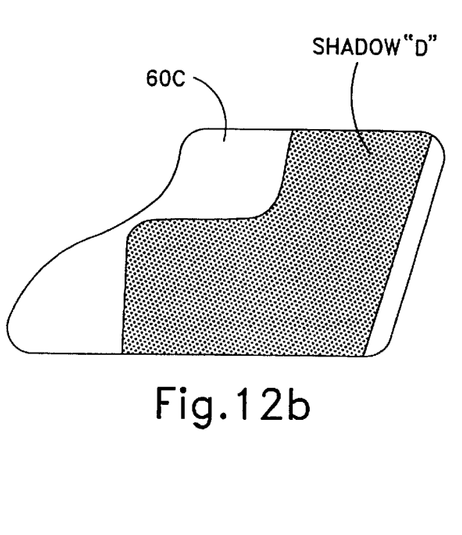
FIG. 12B is a view of the detector member shown in FIG. 11, and shows a side shadow pattern from the occupant shown in FIG. 12A for an energy signal.

During operation of the second embodiment, the energy signal 44A from the first transmitter 42A has a "shadow" that is designated by the bracket "A". The energy signal 44B from the second transmitter 42B has a "shadow" designated by the bracket "B". The energy signal 44C from the third transmitter 42C has a "shadow" designated by the bracket "C". A shadow that is created on the third detector 60C by the fourth energy signal 44D is schematically represented in FIG. 12B.

Signals 74C (FIG. 12A) that are indicative of the presence, size, location, etc. of the shadow are provided from the third detector 60C to the occupant sense module 50 (not shown in FIG. 12A), similar to the signals 74A and 74B that are provided in the first embodiment.

The addition of the fourth transmitter 42D and the third detector 60C (and the resulting additional signals 74C) allows a greater amount of occupant characteristic determinations to occur. Specifically, the combined information proved by the signals 74A–74C permits three-dimensional analysis of the occupant 14, and provides a depth of contrast. Determinations regarding size, stature, weight, girth, etc. are made easier and more accurate by the use of three-dimensional analysis.

From the above description of the invention, those skilled in the art will perceive improvements, changes, and modifications. For example, the locations and numbers of the transmitters and detectors may be different. In one variation, only a single transmitter and a single detector could be used, such as only the transmitter 42D (in the disclosed second embodiment, identified as the "fourth transmitter") and the door-mounted detector 60C (in the disclosed second embodiment, identified as the "third detector"). As another variation, the detectors may be located in the vehicle roof liner, and the transmitters may be located beneath the dash and under the seat. As another variation, the location of the transmitters and detectors could be "reversed". In other words, the transmitter(s) could be located in a vehicle seat and/or a floor, and the detector(s) could be located in a headliner and/or an instrument panel.

Also, in another alternative embodiment, each transmitter (e.g., 42A) emits its respective energy signal with a unique modulating frequency. For example, three transmitters could be modulating at 5, 20 and 80 kHz, respectively. The different modulations would be readily separated by further analog or computer signal processing operating on the post rectified low pass filtered signals. Operating in this manner would allow simultaneous transmission on multiple transmitters at the same time without signal confusion and can be thought of as a form of signal processing. A further possibility would be to have the transmitters operate at different frequencies, e.g., 15, 20 and 25 GHz. However, this would require the use of filters prior to the rectification stage and less than ideal coupling (due to wavelength vs. antenna dimension mismatch) at the patch antennas and would not be a preferred approach.

In an embodiment in which the transmitters 42A–42C emit their respective energy signals 44A–44C simultaneously at different frequencies (e.g., signals at 15 GHz, 20 GHz, and 25 GHz), the signals 74A and 74B may contain response components associated with each transmission frequency. In some cases, frequencies could be selected to enhance this effect, e.g., to differentiate between the presence of water (a human) or a conductor (metallic object) via the relative absorption at the selected frequencies. To further facilitate this, transmitters with multiple frequency modes or co-located transmitters with different frequencies could be used to generate the same shadow patterns but at different frequencies with correspondingly different levels of absorption for different materials. These transmitters could be operated in sequence to eliminate the need for bandpass filters before the rectifiers that would be required for simultaneous transmission.

As another modification, the shadow determination and analysis function 82 may perform an algorithm to process the shadow-indicative information of the signals 74A and 74B, rather than compare the shadow-indicative information to values stored within a memory. The algorithm may include a plurality of threshold determinations. The number of exceeded thresholds, and the locations associated with the exceeded thresholds is indicative of the at least one occupant characteristic (e.g., occupant presence, type, size, and location).

Further, in yet another modification, the detectors 74A and 74B, in conjunction with the shadow determination and analysis function 82 of the occupant sense module 50, could monitor for partial levels of absorption of the energy signal (s) (e.g., 44A). Specifically, some portions of the human body (e.g., a hand) are small and may not completely absorb the EM energy. Thus, only a partial "shading" rather than a full shadow occurs. Also, varying degrees of absorption are indicative of a distinction between a human occupant and an inanimate object. The energy transmission/reception arrangement 40 would be able to distinguish the different levels of absorption, and provide control information for the air bag module 18 accordingly.

Also, if a partial absorption part of the body (e.g., a hand) is blocking (interposed in front of and attenuating the signal of) a transmitter (e.g., 42C), the blocking can be detected. Shading of all of the antenna elements within a normal energy signal impact area would indicate such a scenario. A notification regarding the blocking of a transmitter could be provided to the occupant. The notification would request the occupant to move the blocking body part. Further, the energy transmission/reception arrangement 40 could be set-up to transmit/receive sufficient amounts of the energy signal(s) (e.g., 44) to still make determination(s) about at least one occupant characteristic, despite the shading caused by the blocking body part.

Such improvements, changes and modifications within the skill of the art are intended to be covered by the appended claims.

Having described the invention, the following is claimed:

1. A sensor system for sensing at least one occupant characteristic of a vehicle occupant, said system comprises:
   means for transmitting an energy signal toward an occupant location within a vehicle;
   means for detecting whether absorption of the energy signal by a vehicle occupant occurs and for providing an absorption signal indicative thereof; and
   means for processing the absorption signal to determine at least one occupant characteristic.

2. A system as set forth in claim 1, wherein said means for transmitting includes means for transmitting a high-frequency electromagnetic energy signal toward the occupant location, and said means for detecting includes means for detecting absorption of the energy signal.

3. A system as set forth in claim 1, wherein said means for processing includes means for determining if a vehicle occupant is present as the occupant characteristic.

4. A system as set forth in claim 1, wherein said means for processing includes means for determining a size of a vehicle occupant as the occupant characteristic.

5. A system as set forth in claim 1, wherein said means for processing includes means for determining location of a vehicle occupant with respect to the vehicle as the occupant characteristic.

6. A system as set forth in claim 1, wherein said means for processing includes means for determining a type of a vehicle occupant as the occupant characteristic.

7. A system as set forth in claim 6, wherein said means for processing includes means for determining whether the type of a vehicle occupant is a child in a child seat.

8. A system as set forth in claim 1, wherein said means for detecting absorption includes means for detecting whether a vehicle occupant casts an energy shadow.

9. A system as set forth in claim 8, wherein said means for processing includes means for determining a size of the energy shadow.

10. A system as set forth in claim 8, wherein said means for processing includes means for determining a location of the energy shadow.

11. A system as set forth in claim 8, wherein said means for processing includes means for determining amount of energy absorption.

12. A system as set forth in claim 11, wherein said means for processing includes means for determining a thickness of the vehicle occupant.

13. A system as set forth in claim 1, wherein said means for detecting includes an array of energy detector elements arranged across an area, said means for transmitting is located with respect to said array of energy detector elements to direct the energy signal toward a plurality of the energy detector elements.

14. A system as set forth in claim 1, wherein said means for transmitting and said means for detecting are arranged on different sides of the vehicle occupant location.

15. A system as set forth in claim 1, wherein said means for transmitting is a first means for transmitting and said energy signal is a first energy signal, said system including a plurality of means for transmitting, each for transmitting an energy signal toward the occupant location, said means for detecting includes means for detecting whether absorption of each energy signal by a vehicle occupant occurs and for providing signals indicative thereof.

16. A system as set forth in claim 15, wherein one of said plurality of means for transmitting is mounted within a headliner of the vehicle, and another of said plurality of means for transmitting is mounted within an instrument panel of the vehicle.

17. A system as set forth in claim 15 including means to operate said plurality of means for transmitting to provide a plurality of different absorption patterns for detection by said means for detecting.

18. A system as set forth in claim 15 including means to operate said plurality of means for transmitting in a sequence.

19. A system as set forth in claim 15 including means for simultaneously operating said plurality of means for transmitting to simultaneously transmit a plurality of energy signals, each of the plurality of energy signals having a different frequency.

20. A system as set forth in claim 15, wherein said means for detecting includes means for detecting varying degrees of absorption for different energy signals from different means for transmitting, said means for processing including means for distinguishing a human occupant from an inanimate object in response to the detected varying degrees of absorption.

21. A system as set forth in claim 1, wherein said means for detecting is a first means for detecting, said system including a plurality of means for detecting, each for detecting whether absorption of the energy signal by the occupant occurs and for providing a signal indicative thereof.

22. A system as set forth in claim 21, wherein one of said plurality of means for detecting is mounted within a seat of the vehicle, and another of said plurality of means for detecting is mounted within a floor of the vehicle.

23. A system as set forth in claim 21, wherein one of said plurality of means for detecting is mounted within a door of the vehicle.

24. A system as set forth in claim 1, wherein said means for transmitting is mounted within a headliner of the vehicle, and said means for detecting is mounted within a seat of the vehicle.

25. A system as set forth in claim 1, wherein said means for transmitting is mounted within a portion of the vehicle other than a headliner, and said means for detecting is mounted with a portion of the vehicle other than a seat of the vehicle.

26. A system as set forth in claim 25, wherein the portion of the vehicle other than a headliner is the seat of the vehicle, and the portion of the vehicle other than a seat is the headliner of the vehicle.

27. A system as set forth in claim 25, wherein the portion of the vehicle other than a seat is a door of the vehicle.

28. A system as set forth in claim 1, wherein said means for processing includes means for providing a signal indicative of the at least one occupant characteristic for use within an occupant protection system.

29. A method for sensing at least one occupant characteristic of a vehicle occupant, said method comprises:

transmitting an energy signal toward an occupant location within a vehicle;

detecting whether absorption of the energy signal by a vehicle occupant occurs;

providing an absorption signal indicative of the occurrence of energy absorption; and processing the absorption signal to determine at least one occupant characteristic.

30. A method as set forth in claim 29, wherein said step of transmitting includes transmitting a high-frequency electromagnetic energy signal toward the occupant location, and said step of detecting includes detecting absorption of the energy signal.

31. A method as set forth in claim 29, wherein said step of processing includes determining if a vehicle occupant is present as the occupant characteristic.

32. A method as set forth in claim 29, wherein said step of processing includes determining a size of a vehicle occupant as the occupant characteristic.

33. A method as set forth in claim 29, wherein said step of processing includes determining a location of a vehicle occupant with respect to the vehicle as the occupant characteristic.

34. A method as set forth in claim 29, wherein said step of processing includes determining a type of a vehicle occupant as the occupant characteristic.

35. A method as set forth in claim 34, wherein said step of processing includes determining whether the type of a vehicle occupant is a child in a child seat.

36. A method as set forth in claim 29, wherein said step of detecting absorption includes detecting whether a vehicle occupant casts an energy shadow.

37. A method as set forth in claim 36, wherein said step of processing includes determining a size of the energy shadow.

38. A method as set forth in claim 36, wherein said step of processing includes determining a location of the energy shadow.

39. A sensor system for sensing at least one occupant characteristic of a vehicle occupant, said system comprises:

means for transmitting an energy signal toward an occupant location within a vehicle;

means for detecting whether absorption of the energy signal by a vehicle occupant occurs;

means for providing an absorption signal indicative of the occurrence of energy absorption; and means for processing the absorption signal to determine at least one occupant characteristic.

40. A method for sensing at least one occupant characteristic of a vehicle occupant, said method comprises:

transmitting an energy signal toward an occupant location within a vehicle;

detecting whether absorption of the energy signal by a vehicle occupant occurs and providing an absorption signal indicative thereof; and processing the absorption signal to determine at least one occupant characteristic.

* * * * *